(12) United States Patent
Takayanagi

(10) Patent No.: US 8,308,024 B2
(45) Date of Patent: Nov. 13, 2012

(54) PARTS FEEDER

(75) Inventor: Makoto Takayanagi, Hamamatsu (JP)

(73) Assignee: Trinc.org, Shizuoka (JP)

( * ) Notice: Subject to any disclaimer, the term of this patent is extended or adjusted under 35 U.S.C. 154(b) by 358 days.

(21) Appl. No.: 12/629,110

(22) Filed: Dec. 2, 2009

(65) Prior Publication Data
US 2010/0155196 A1   Jun. 24, 2010

(30) Foreign Application Priority Data

Dec. 22, 2008 (JP) .................................. 2008-324872
Oct. 13, 2009 (JP) .................................. 2009-235942

(51) Int. Cl.
*B65D 83/00* (2006.01)
(52) U.S. Cl. ........................ 221/135; 221/178; 221/200

(58) Field of Classification Search .................. 221/200, 221/201, 202, 204, 135
See application file for complete search history.

(56) References Cited

U.S. PATENT DOCUMENTS

| | | | | |
|---|---|---|---|---|
| 1,719,221 | A * | 7/1929 | Gibney | 221/167 |
| 3,928,753 | A * | 12/1975 | Kivett et al. | 377/6 |
| 4,279,740 | A * | 7/1981 | Isogaya | 209/12.2 |
| 4,452,256 | A * | 6/1984 | Wochnowski et al. | 131/303 |
| 4,462,496 | A * | 7/1984 | Stafford | 209/643 |
| 6,148,641 | A * | 11/2000 | Blough et al. | 65/529 |
| 6,644,464 | B1 * | 11/2003 | Demarest et al. | 198/757 |
| 7,703,636 | B2 * | 4/2010 | Sus et al. | 221/150 HC |

* cited by examiner

Primary Examiner — Timothy Waggoner
(74) Attorney, Agent, or Firm — Leighton K. Chong

(57) ABSTRACT

A parts feeder includes a feed device or tray for putting a pile of parts on. The feed device imparts vibration to the pile of parts to feed them. An ion generating device is disposed above the feed device for providing ions to the parts. An airflow passage is formed in the feed device for sucking in air to introduce ions within the pile of parts.

14 Claims, 5 Drawing Sheets

⊕ ⊖ EXTINCT STATIC ELECTRICITY

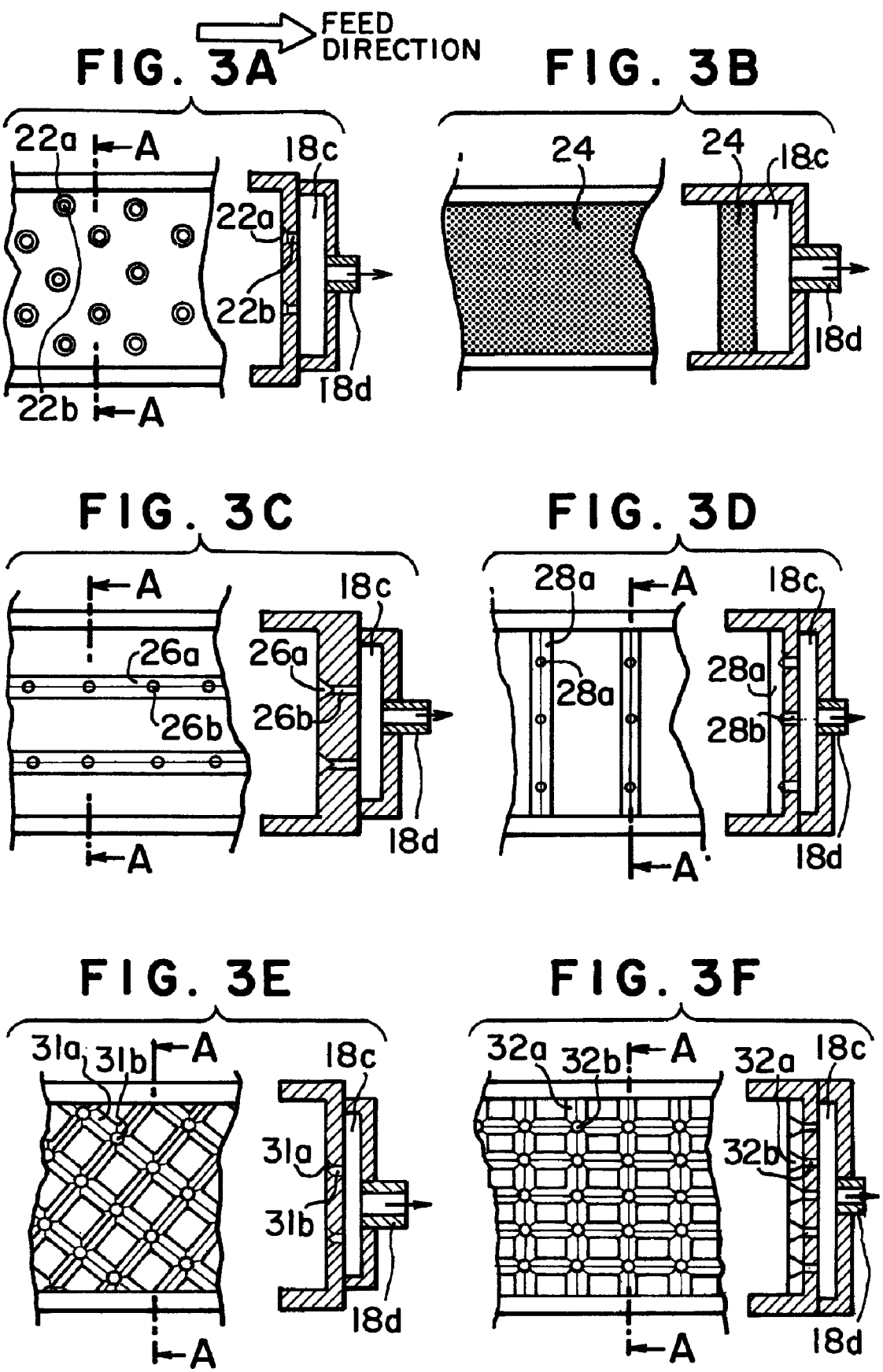

STATIC ELECTRICITY ⊕ ⊖
EXTINCT STATIC ELECTRICITY ⊕ ⊖

PARTS FEEDER

TECHNICAL FIELD

This invention relates to a parts feeder for feeding or transferring parts or works on the path by imparting special vibration to a tray on which the parts are put.

BACKGROUND OF INVENTION

In order to feed parts such as chip parts, a parts feeder in which parts on the tray are fed by imparting vibration to the tray is used. The fundamental principle of parts feeder resides in that material bodies on the tray are fed by imparting special vibration to feed bodies forward.

Since, at the parts feeder, contact and release are repeated between the tray and the parts and slide is generated in a direction of feed when contacted, release charge and friction charge are generated between the tray and parts. As a result of charge, electrostatic attraction is generated between the tray and the parts. Furthermore, electrostatic attraction is also generated between the parts by contact, release and friction between the parts. In case that the fed parts are light in weight, even if the parts are fed forward at the same velocity, its kinetic energy ($\frac{1}{2}mv^2$) is small and thus the electrostatic attraction would become more than the kinetic energy. As a result the parts are not fed forward smoothly.

In such a case, the parts to be fed do not move in a direction of feed and stay in the same position, and thus the retention of the parts is generated. Although, in order to solve the problem, an ion generating device for removing the generated static electricity may be provided above the parts feeder, the static electricity generated on the under surfaces of the parts, particularly the lowermost parts on the side of the tray cannot be removed. Furthermore, in case that the parts are accumulated in a pile, the static electricity charged on the exposed surfaces of the parts in a pile can be removed, but the static electricity charged on the surfaces of the parts within the pile cannot be removed.

FIG. 5 diagrammatically shows this phenomenon. In the FIG. 5, a parts feeder 10 includes a feeding device or tray 12 for feeding parts by special vibration and an ion generating device 16 disposed above the tray 12 for providing ions 20 to the parts 14 to remove static electricity. The parts 14 are accumulated in a pile on the surface 12a of the tray 12 and then are fed. In order to remove static electricity from the parts, the ions 20 generated by the ion generating device 16 reach the outer surfaces of the parts and the surface 12a of the tray 12 and then the static electricity generated on these surfaces are removed. However, the ions cannot reach the under surfaces 14a of the parts 14 closely placed on the surface 12a of the tray 12. Since the static electricity generated on the surface 12a of the tray 12 and the under surfaces 14a of the parts 14 cannot be removed, even if special vibration is imparted to the tray, the parts 14 remain attached to the tray and then the parts are vibrated together with the tray. As a result the parts are not fed. Furthermore, the ions are not provided to the parts 14 within the pile and thus static electricity cannot be removed.

Therefore, it is an object of the present invention to provide a parts feeder which can almost perfectly remove static electricity generated on the tray and the parts due to contact, release and friction between the tray and parts and contact, release and friction between the parts, and can feed the parts smoothly.

SUMMARY OF INVENTION

To accomplish the object, there is provided a parts feeder which comprises a feed device for putting a pile of parts on and imparting vibration to said pile of parts to feed them, an ion generating device disposed above said feed device for providing ions to said parts, and an airflow passage formed in said feed device for sucking in air to introduce ions within said pile of parts.

There is provided a parts feeder which comprises a feed device for putting a pile of parts on and imparting vibration to said pile of parts to feed them, an ion generating device disposed above said feed device for providing ions to said parts, and a vacuum suction arm disposed in contact with the surface of said feed device or above said feed device at a short distance for sucking in air to introduce ions within said pile of parts and blowing out the air outside.

Other objects, features, and advantages of the present invention will be explained in the following detailed description of the invention having reference to the appended drawings:

BRIEF DESCRIPTION OF DRAWINGS

FIG. 3 is a view showing various airflow passages used in the parts feeders.

DETAILED DESCRIPTION OF THE INVENTION

First Embodiment

Figure 1:
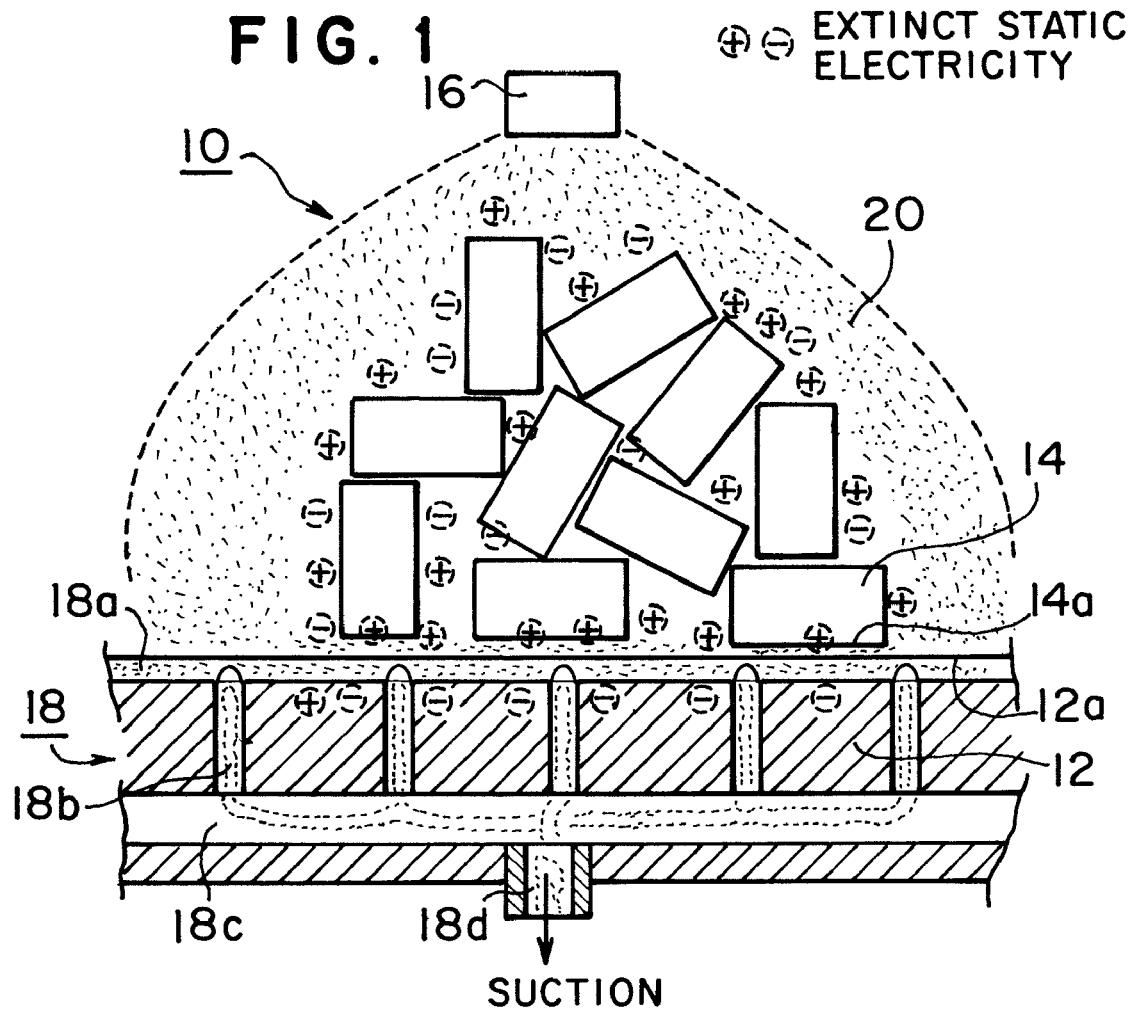
FIG. 1 is a cross-sectional view showing a first embodiment of a parts feeder according to the present invention.

FIG. 1 is a cross-sectional view showing a first embodiment of a parts feeder according to the present invention. In FIG. 1, a parts feeder 10 includes a feeding device or tray 12 for feeding parts 14 by moving up and down diagonally or obliquely, an ion generating device 16 disposed above the tray 12 for providing ions 20 to the parts 14 to remove static electricity and an air passage portion 18 for introducing ions 20 below the under surfaces of the lowermost parts 14 at least.

The air passage portion 18 takes various shapes. The detail of the first embodiment will be explained with reference to FIGS. 1 and 2, and the other examples will be explained with reference to FIG. 3. In FIGS. 1 and 2, the air passage portion 18 includes horizontal grooves 18a formed in the surface 12a of the tray 12, vertical fine pores 18b in communication with the horizontal grooves 18a at the upper portions thereof, an aperture 18c in communication with the pores 18b at the lower portion thereof, and a suction opening 18d provided under the aperture 18c. Suction and blowout are carried out through the suction opening 18d.

Figure 2A:
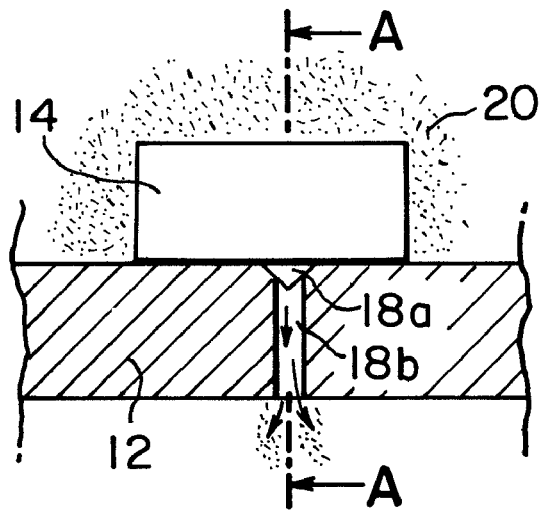
FIG. 2 is a view for explaining about the suction state of the parts feeder.
Figure 2B:
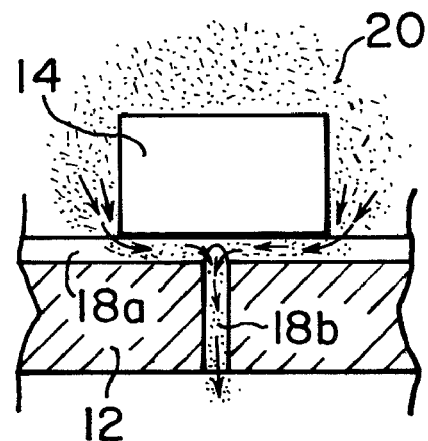

FIG. 2 is a view for explaining about the suction state of the parts feeder, FIG. 2A being a cross-sectional view seen from the front side of feeding path, and FIG. 2B being a cross-sectional view along the lines of A-A of FIG. 2A. Since as shown in FIG. 2B, atmosphere around the part 14 put on the tray 12 at the position of groove 18a are in communication with the inside of the groove 18a, if the inside of the groove 18a is sucked in, outside air is introduced into the inside of the groove 18a, and thereafter the air thus introduced flows through the pores 18b, the aperture 18c and suction opening 18d. Finally the air is sucked outside from the lower portion of the tray 12. Furthermore, the groove 18a is formed with chamfer relative to the pores 18b to prevent the parts from sticking to the groove, to take in air from large area, and to enable the parts 14 to be fed smoothly.

When air is sucked in, the ions provided to the tray 12 at upper portion thereof and the outside parts 14 are introduced or carried between the parts in a pile. As a result static attraction force between the tray and the inside parts disappears. Furthermore, that air suction includes suction between the inside parts in a pile and thus static attraction force generated between the inside parts disappears.

Next, with reference to FIG. 3, various shapes of grooves, particularly V-shaped groove or chamfer or the like formed on the feed path of the tray and various shapes of pores in communication with the grooves will be explained.

Second Embodiment

In FIG. 3A, there is shown an example in which at least one pore is formed in the feed path. In the example, no groove is formed in the feed path or the tray and a number of chamfers 22a and pores 22b in communication with the chamfers 22a are formed in the tray.

In FIG. 3B, there is shown an example in which the feed path or tray as a whole is made of spongy body or porous body. In the example, since the ion-wind or ions containing air is gently sucked in through the spongy body 24, static electricity is removed all over in a large area.

In FIG. 3C, there is shown an example in which the grooves 26a are formed in the tray in a feed direction and the pores 26b are formed along the grooves 26a at their lower portions. In the construction, the feed of parts are not interrupted and then are fed smoothly.

In FIG. 3D, there is shown an example in which the grooves 28a are formed in the tray in a direction perpendicular to the feed direction, the pores 28b are formed along the grooves 28a at their lower portions. The construction has a disadvantage in that the parts are likely to stick to the grooves.

In FIG. 3E, there is shown an example in which the grooves 31a are formed in the tray in obliquely right and left directions relative to the feed direction, that is, X-shaped form and the pores 31b are formed along the grooves 31a at their lower portions. In the construction, the ions can reach the bottom surfaces of the parts effectively, and the interruption by the grooves during their feed is few.

In FIG. 3F, there is shown an example in which the grooves 32a are formed in the tray in directions perpendicular and parallel to the feed direction and the pores 32b are formed along the grooves 32a at their lower portions. In the construction, the ions can reach the bottom surfaces of the parts effectively. However, the construction has a disadvantage in that the parts are likely to stick to the grooves as explained in the example shown in FIG. 3D.

Third Embodiment

The timing in sucking in and blowing out air through pores formed in the feed path and pattern will be explained with reference with FIG. 4.

Figure 4A:
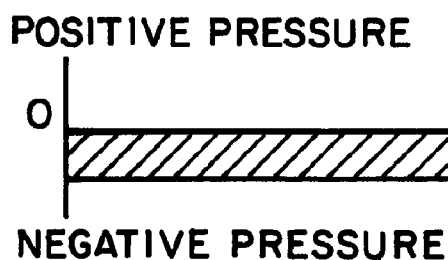
FIG. 4 is a graph for explaining about the timing for suction or suction plus blowout used in the parts feeder.

FIG. 4A shows an example in which air is always or full-time sucked in during the feed of parts. Due to full-time sucking in, static elimination is carried out most effectively. In the example, air is weakly sucked in to the degree that the sucking force does not disturb the feed of parts.

Figure 4B:
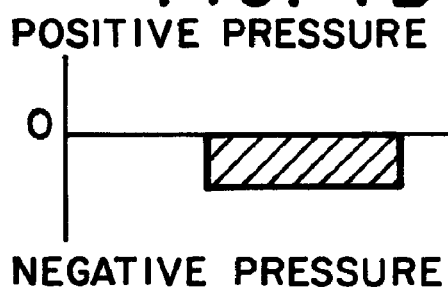

FIG. 4B shows an example in which air is intermittently sucked in during the feed of parts. In the example, the quantity of static charge gradually accumulated by the feed of parts is intermittently removed to prevent halt of parts.

Figure 4C:
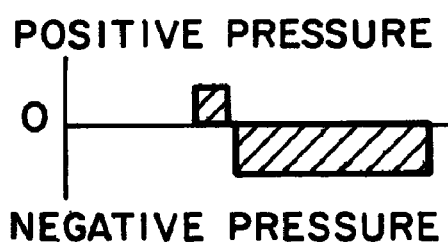

FIG. 4C shows an example in which air is blown out from the pores for a moment during the feed of parts and then sucked in for a period of time. In the example, in case that parts are accumulated in a pile, by blowing out for a moment gaps are formed among the parts, and thereafter by sucking in, ions can be introduced through the gaps thus formed, and then static electricity between the parts can be removed efficiently.

Figure 4D:
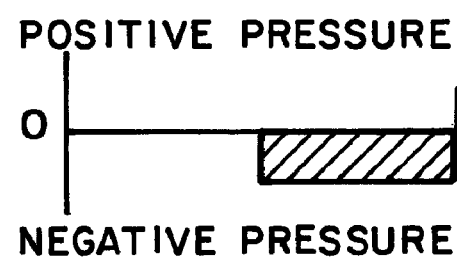
Figure 5:
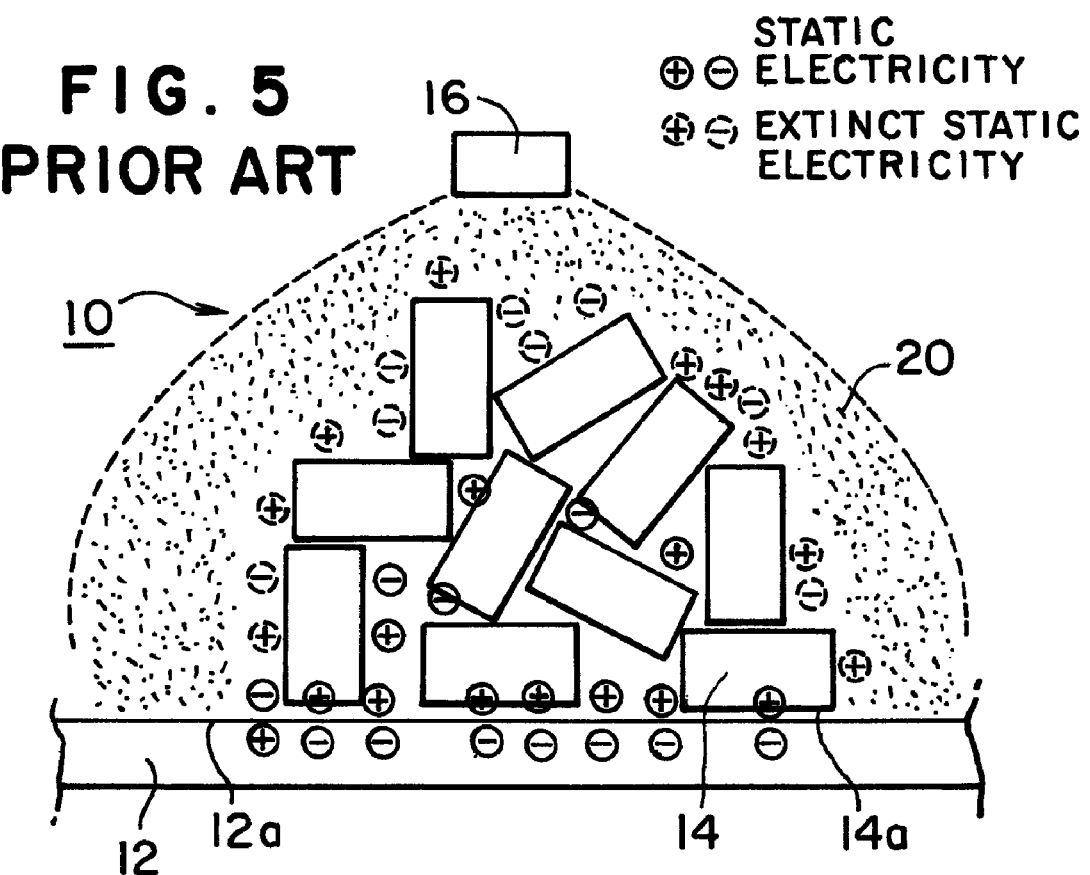
FIG. 5 is a cross-sectional view showing a conventional parts feeder.

FIG. 4D shows an example in which air is sucked in for a period of time during the feed of parts and thereafter is blown out for a moment. In the example, in case that parts are accumulated in a pile, by sucking in for a period of time static electricity between the parts is removed, and after removal of attraction force exerted between the parts, by blowing out for a moment the parts attached to each other due to suction are separated. Consequently the feed of parts can be carried out smoothly.

Although there are not shown, the sucking in and/or the blowing out may be carried out based on the combination of the examples shown in FIGS. 4A to 4D. The combination enables the pattern of sucking in and blowing out with combined merits to be drawn.

In case that the parts to be fed are small and light as chip parts, it is preferable that the ion generating device disposed above the parts feeder is of a non-wind type in which ions are emitted calmly without using a fan blower. If wind type of ion generating device using a fan blower for flying ions away is used, the parts happen to be flown away. Furthermore, in case that the parts are not small and not light the wind type of ion generating device may be used. In case that the parts are accumulated in a pile and ions are introduced into the inside of pile, wind type of ion generating device is effective to suck in ions.

Fourth Embodiment

The parts feeders explained in the first and second embodiments have no problems when they are newly produced. However, when they are applied to the parts feeder now used, it is necessary to apply micro-fabrication of pores to the tray and thus it is not preferable to adopt the first and second embodiments in view of fabrication and costs. Therefore, the fourth embodiment is directed to the parts feeder without fabrication of pores. Furthermore, the parts suitable for feed in the first and second embodiments are relatively big ones such as members for plastic molding or pellets of 20*20*20 mm in the biggest size while the parts suitable for feed in the fourth embodiment are relatively small ones such as chip members or electronic parts of 0.4*0.2*0.2 mm in the smallest size. However, the present invention is not limited to the kind and size of the parts.

Figure 6:
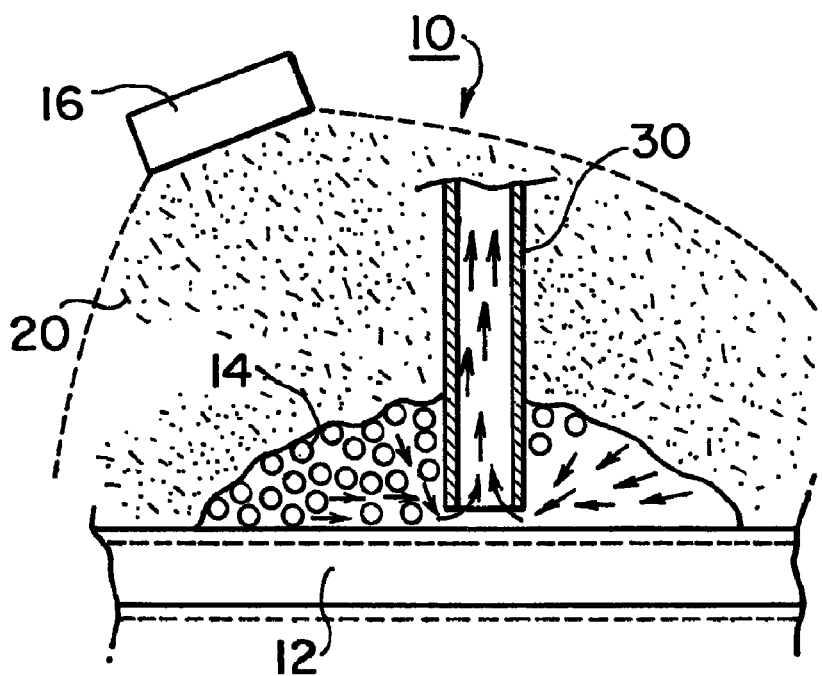
FIG. 6 is a cross-sectional view showing a fourth embodiment of a parts feeder according to the present invention.

The fourth embodiment will be explained with reference to FIG. 6. In the embodiment the parts are accumulated in a pile on the tray 12 of the parts feeder 10. Although vibration is imparted to the tray 12 to feed the parts, as mentioned above static electricity is accumulated on the parts or the tray due to vibration. Consequently static attraction force is exerted between the parts and between the parts and the tray and thus the parts turn out not to be fed.

In order to remove static electricity, an ion generating device 16 is disposed above the feed path in a manner similar to the first and second embodiments. A vacuum suction arm 30 is disposed above the tray 12 at a short distance, for example, by suspension. Ions are emitted by the ion generating device 16 toward the parts from above. While the vacuum suction arm 30 has access to the surface of the tray or is in contact with the tray, air is sucked in from the area near the bottom of a pile of parts. The ion containing air which exists on the outside of pile of parts is introduced into the inside of the pile by suction of the vacuum suction arm 30. Consequently static electricity within the pile is neutralized. The static attraction force also becomes less and thus feed can be carried out. The vacuum suction arm is made to be streamlined in a direction of feed.

Fifth Embodiment

Figure 7A:
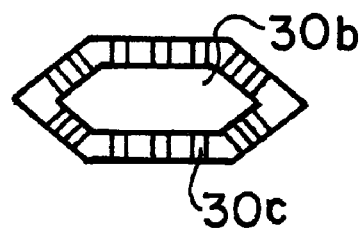
FIG. 7 is a view showing in detail a vacuum suction arm used in a parts feeder, FIG. 7A being a bottom view, FIG. 7B being a front view, and FIG. 7C being a side view.
Figure 7B:
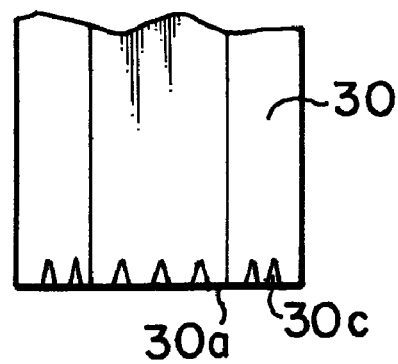
Figure 7C:
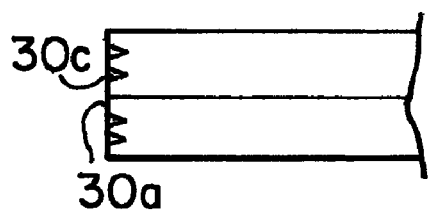

The fifth embodiment will be explained with reference to FIG. 7. FIG. 7 is a view for explaining about the detail of lower portion of vacuum suction arm. The lower end or bottom of lower portion of vacuum suction arm 30 functions as suction cup 30a for adsorbing the tray 12. The vacuum suction arm 30 is hollow and is formed with a central airflow passage 30b. Furthermore, the vacuum suction arm is formed at its bottom portion with a plurality of small surrounding airflow passages 30c in communication with central airflow passage 30b from the surrounding environment to suck in the surrounding air from the outside. The air is sucked in while the vacuum suction arm 30 has access to the surface of the tray or is in contact with the tray. When the vacuum suction arm 30 adsorbs the tray 12, These surrounding airflow passages 30c suck in surrounding air.

Sixth Embodiment

Figure 8A:
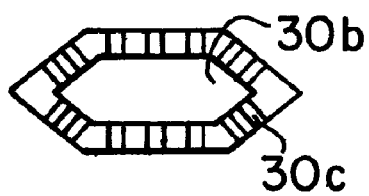
FIG. 8 is a view showing in detail another vacuum suction arm used in a parts feeder, FIG. 8A being a bottom view, and FIG. 8B being a front view.
Figure 8B:
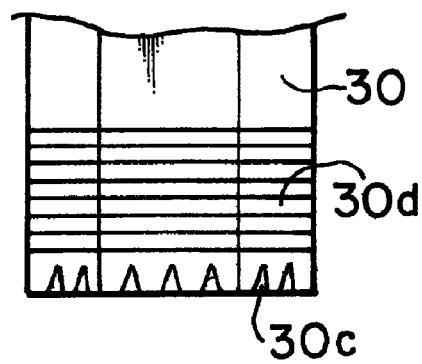

The sixth embodiment will be explained with reference to FIG. 8. The vacuum suction arm includes a resilient portion 30d and a suction cup under the resilient portion 30d. The air is sucked in while the suction cup 30a adsorbs the tray 12. Although the tray is vibrated, the resilient portion 30d absorbs that vibration. The vacuum suction arm in the embodiment is easily installed since fine adjustment is not required. The vacuum suction arm is made as one.

Seventh Embodiment

Figure 9A:
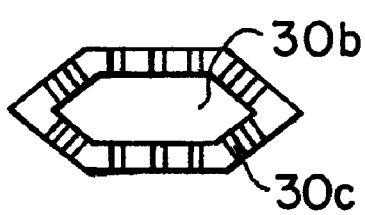
FIG. 9 is a view showing in detail a still another vacuum suction arm used in a parts feeder, FIG. 9A being a bottom view, and FIG. 9B being a front view.
Figure 9B:
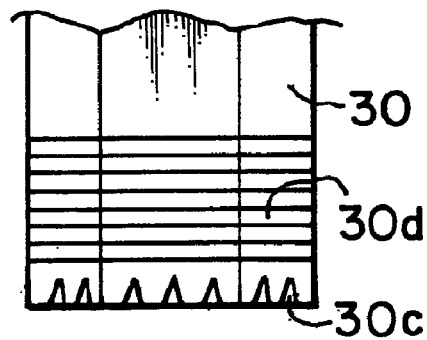

The seventh embodiment will be explained with reference to FIG. 9. The vacuum suction arm includes a resilient portion 30d and a suction cup under the resilient portion 30d. The air is sucked in while the suction cup 30a adsorbs the tray 12. Although the tray is vibrated, the resilient portion 30d absorbs that vibration. The vacuum suction arm in the embodiment is easily installed since fine adjustment is not required. The vacuum suction arm is assembled by the resilient portion 30d provided at its intermediate portion and the suction cup provided at its bottom.

It is understood that many modifications and variations may be devised given the above description of the principles of the invention. It is intended that all such modifications and variations be considered as within the spirit and scope of this invention, as it is defined in the following claims.

The invention claimed is:

1. A parts feeder which comprises
a feed device having a vibrated plate for putting a pile of parts thereon and imparting vibration to said pile of parts to feed them,
an ion generating device disposed above said feed device for providing ions to said parts, and
an airflow passage formed in said vibrated plate of said feed device for sucking in air to introduce ions within said pile of parts,
in which said airflow passage includes pores provided within said vibrated plate, and said pores are open at the upper portion of said vibrated plate and air is sucked in from the side of bottom of said vibrated plate.

2. A parts feeder according to claim 1 in which said pores are formed with chamfers at the upper portion of said feed device, or grooves are provided by elongated chamfers.

3. A parts feeder according to claim 2 in which said grooves are either one of grooves in a direction parallel to the feed direction, grooves in a direction perpendicular to the feed direction, grooves in obliquely right and left directions relative to the feed direction, and grooves in directions parallel and perpendicular to the feed direction.

4. A parts feeder according to claim 1 in which said airflow passage is a spongy body.

5. A parts feeder according to claim 1 in which said ion generating device is of a non-wind type in which a fan blower is not used.

6. A parts feeder according to claim 1 in which said ion generating device is of a non-wind type in which a fan blower is not used.

7. A parts feeder according to claim 1 in which suction of air is carried out always or intermittently.

8. A parts feeder according to claim 7 in which in case of intermittent suction of air, blowout of air is carried out before or after said suction of air.

9. A parts feeder according to claim 8 in which said suction of air and/or said blowout of air are carried out in a limited volume and/or limited period so as not to interrupt the feed.

10. A parts feeder which comprises
a feed device for putting a pile of parts thereon and imparting vibration to said pile of parts to feed them,
an ion generating device disposed above said feed device for providing ions to said parts, and
a vacuum suction arm disposed in contact with the surface of said feed device or above said feed device at a short distance for sucking in air to introduce ions within said pile of parts and blowing out the air outside,
in which said vacuum suction arm absorbs said feed device at its bottom while air is sucked in.

11. A parts feeder according to claim 10 in which said vacuum suction arm includes a central airflow passage at its central portion and a plurality of surrounding airflow passages in communication with said central airflow passage at the bottom of said central airflow passage.

12. A parts feeder according to claim 10 in which said vacuum suction arm is made to be streamlined in the feed direction.

13. A parts feeder according to claim 10 in which said vacuum suction arm includes a resilient body.

14. A parts feeder which comprises:
a feed device for putting a pile of parts thereon and imparting vibration to said pile of parts to feed them,
an ion generating device disposed above said feed device for providing ions to said parts, and
an airflow passage formed in said feed device for sucking in air to introduce ions within said pile of parts,
in which said airflow passage is a spongy body.

* * * * *